United States Patent [19]

McCarty

[11] Patent Number: 4,631,435

[45] Date of Patent: Dec. 23, 1986

[54] CONSEQUENT POLE PERMANENT MAGNET ROTOR

[75] Inventor: Frederick B. McCarty, San Pedro, Calif.

[73] Assignee: The Garrett Corporation, Los Angeles, Calif.

[21] Appl. No.: 810,967

[22] Filed: Dec. 18, 1985

[51] Int. Cl.⁴ .......................................... H02K 21/14
[52] U.S. Cl. .................................... 310/156; 310/181; 310/261
[58] Field of Search .............. 310/156, 162, 257, 261, 310/166, 181; 29/598

[56] References Cited

U.S. PATENT DOCUMENTS

| | | | |
|---|---|---|---|
| 640,760 | 1/1900 | Geisenhoner. | |
| 729,655 | 6/1903 | Parsons. | |
| 2,767,368 | 10/1956 | Kober | 322/57 |
| 2,963,599 | 12/1960 | Gayler | 310/153 |
| 3,132,270 | 5/1964 | Phelon | 310/156 |
| 3,392,294 | 7/1968 | Campbell | 310/168 |
| 3,413,502 | 11/1968 | Schwab | 310/181 |
| 3,510,752 | 5/1970 | Raver et al. | 322/28 |
| 3,512,075 | 5/1970 | Raver et al. | 322/28 |
| 3,512,076 | 5/1970 | Larson et al. | 322/28 |
| 4,339,874 | 7/1982 | McCarty | 310/261 |

FOREIGN PATENT DOCUMENTS 462426 11/1913 France.

Primary Examiner—Patrick R. Salce
Assistant Examiner—D. L. Rebsch
Attorney, Agent, or Firm—Leslie S. Miller; Albert J. Miller

[57] ABSTRACT

A rotor for an electrical machine has large permanent magnets located at half the pole locations, with alternating pole locations containing ferromagnetic projections which become consequent poles in the rotor. The permanent magnet poles have a high reluctance, while the ferromagnetic poles have a very low reluctance, thereby affording variable flux linkage between the rotor and a stator. Magnetic homogeneity is improved, while susceptibility to thermal degradation in the rotor is reduced substantially.

17 Claims, 8 Drawing Figures

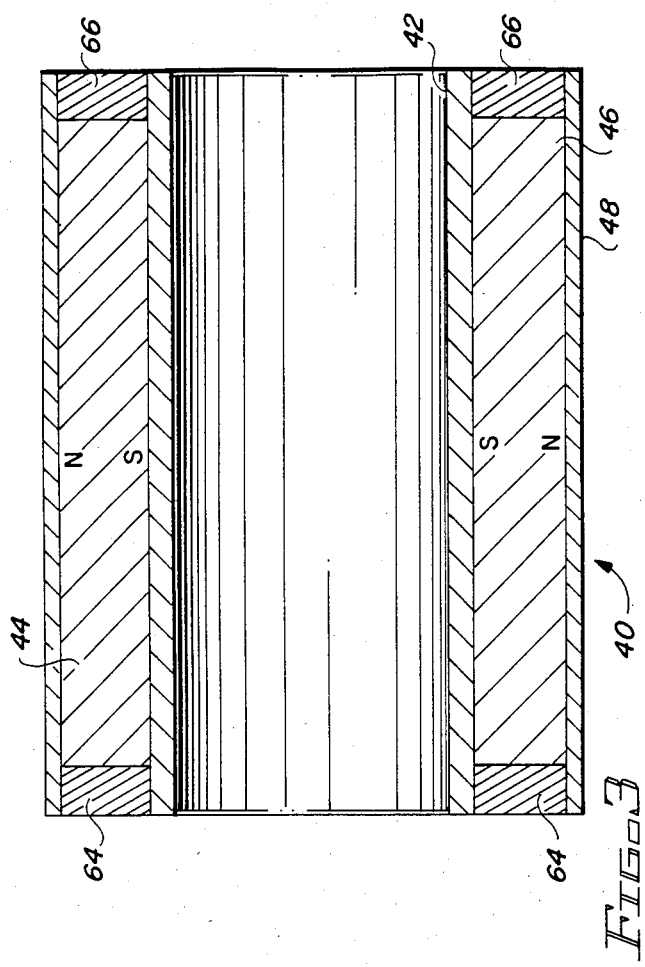
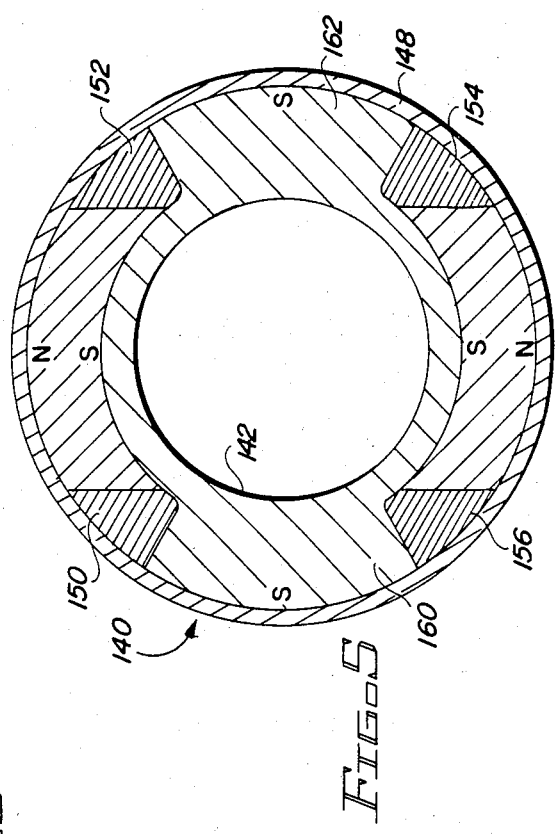
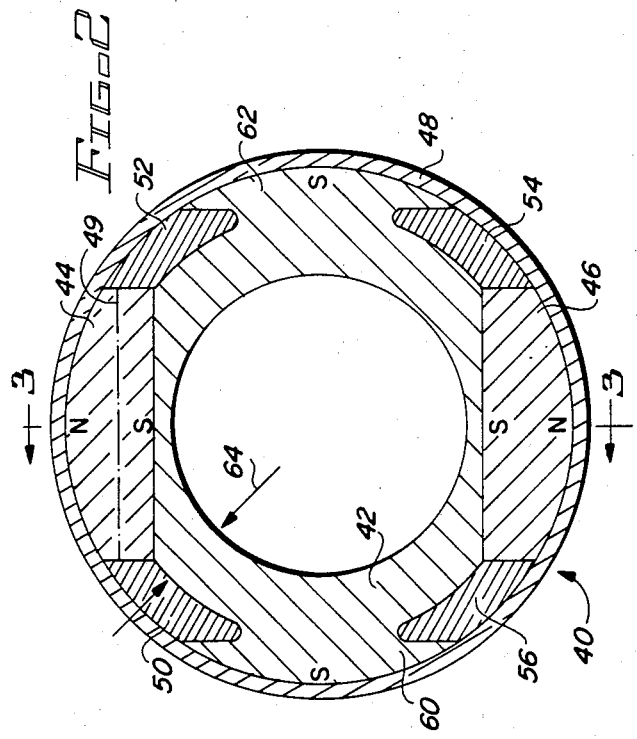
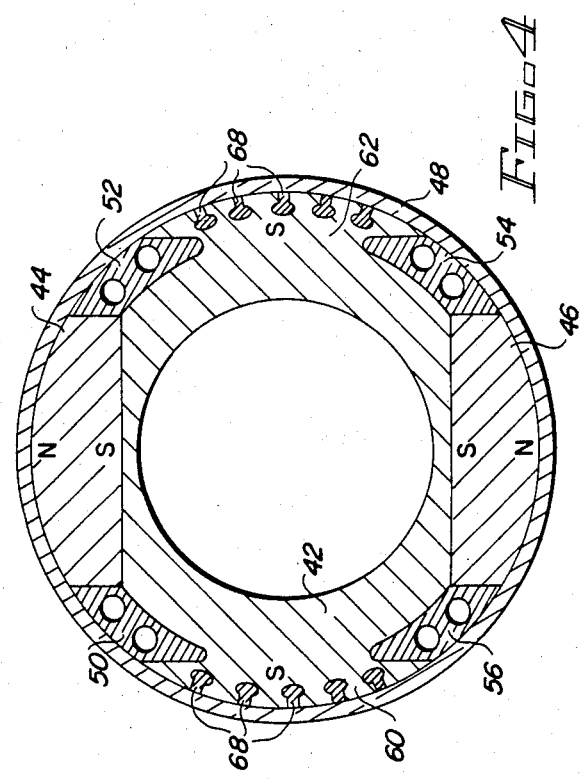

CONSEQUENT POLE PERMANENT MAGNET ROTOR

BACKGROUND OF THE INVENTION

Field of the Invention

The present invention relates generally to construction of a permanent magnet rotor for use in high speed permanent magnet machines, and more particulary to a permanent magnet rotor construction utilizing high magnetic energy permanent magnets to produce a rotor design having alternating low reluctance and high reluctance poles to thereby allow variable flux linkage, while minimizing axially directed parasitic fluxes and providing superior thermal degradation characteristics, as well as excellent rotor stiffness to allow applications at very high speeds.

The recent development of high energy product permanent magnets provides a great potential for improvement in permanent magnet machine design and efficiency. Increased energy product permanent magnets made of samarium-cobalt currently have an energy product of as high as 26 mega-gauss-oersted (MGO) while permanent magnets made of neodymium-iron-boron have an energy product of as high as 35 MGO, with potential energy products of 45 MGO likely being available in the near future.

Conventional permanent magnet rotors consist of a plurality of axially extending permanent magnets mounted around the outer periphery of a ferromagnetic yoke or core, with damper bars made of electrically conductive, non-magnetizable material being used essentially as spacers between the plurality of permanent magnets arranged about the outer periphery of the yoke. Additionally, a pair of damper end rings, which are also made of non-magnetizable material, may be used at the ends of the yoke to restrain the permanent magnets and damper bars from axial movement on the core. A thin cylindrical hoop, also made of non-magnetizable material, is then installed about the outer periphery of the rotor to retain the permanent magnets and the damper bars in position on the ferromagnetic yoke, particularly against large centrifugal forces operating during high speed rotation of the rotor.

The hoop is generally installed on the rotor by a heat shrinking operation, in which the rotor is cooled and the hoop is heated to a high temperature to cause the hoop to expand relative to the rotor. The hoop is placed over the rotor, and shrinks to form an interference fit with the rotor. Unfortunately, during this operation the magnet surface areas are exposed to abusive surface heat which will cause thermal degradation of the permanent magnets.

While conventional magnets are only slightly susceptible to thermal degradation caused by heat shrinking the hoop over the rotor, the new high energy product permanent magnets are somewhat more susceptible to thermal degradation. Samarium-cobalt permanent magnets may be damaged by heating during the installation of the hoop onto the rotor, resulting in likely degradation in magnetic performance of the permanent magnets, as well as in the likelihood of increasing in a random fashion parasitic fluxes further deteriorating rotor performance. Neodymium-iron-boron magnets are even more sensitive to thermal degradation than are samarium-cobalt permanet magnets, roughly by a factor of three.

It is therefore apparent that it is highly desirable that a permanent magnet rotor utilizing such high energy product permanent magnets be designed to be less susceptible to thermal degradation caused by diffusion of surface heat from the hot retaining hoop to the magnets. While in some instances, it may be possible to install the hoop without using heat shrinking, there are nevertheless many instances in which heat shrinking is the only operation which is practical, and accordingly the redesign of the rotor configuration to make the permanent magnets less susceptible to thermal degradation is an object of the present invention.

It is also desirable to have the best possible magnetic homogeneity of the magnets used in a rotor, since nonuniformity of magnets will cause equalizing fluxes to flow in the direction of the rotor axis, a particularly objectionable phenomenon. The result of this phenomenon is that axially directed parasitic fluxes will exist in the stator core, which is typically made of laminated iron, with the parasitic fluxes being in a direction normal to the laminations. This phenomenon will cause disproportionate losses substantially the same as if the parasitic fluxes were induced in solid iron rather than in a laminated iron stator core.

When using high energy product permanent magnets such as those described above, the magnets are frequently a bonded assembly of smaller pieces, since it is generally possible to magnetize only fairly small pieces of magnetic medium to the high levels of magnetic energy utilized in such magnets. It is therefore apparent that unless the machine is fairly small, the magnets will be a bonded assembly of smaller pieces not having as good magnetic homogeneity as if the magnet were made of a single piece. This factor also will increase the tendency to have axially directed parasitic fluxes. Accordingly, it is an object of the present invention to minimize to the extent possible such axially directed parasitic fluxes by obtaining the best possible magnetic homogeneity of the permanent magnets.

The use of high energy product permanent magnets may make it desirable at times to vary the flux linkage between the rotor and the stator, as described in copending patent application No. 810,968, filed concurrently with the present application, which application is hereby incorporated herein by reference. In order to simplify the scheme by which the flux linkage between the rotor and stator is varied, it has been found that it is desirable to have a rotor having alternating high reluctance and low reluctance poles. Accordingly, it is also an object of the present invention to provide a permanent magnet rotor which has alternating high and low reluctance poles to facilitate a variable flux linkage between the rotor and stator.

SUMMARY OF THE INVENTION

The present invention solves the problems and fulfills the objectives discussed above by providing a permanent magnet rotor which has alternating high reluctance permanent magnet poles and low reluctance consequent poles, a situation in which only half of the poles are directly excited. This arrangement, which is unique in the art, utilizes the high reluctance permanent magnet poles to consequently excite the alternating low reluctance ferromagnetic poles.

In the construction of a rotor according to the teachings of the present invention, the same total amount of magnet material is used as in a conventional rotor, with the total number of magnets being diminished by half and therefore the size of each magnet doubling. The increment of material in each magnet is not crowned but rather of rectangular shape, which increases the overall magnetic homogeneity of each of the magnets and minimizes the above-mentioned axially directed parasitic fluxes. Secondly, since the magnets are doubled in size, and since the surface of the magnet at the outer diameter of the rotor is not increased, the depth of the magnet extending radially inwardly into the rotor is increased, which therefore dramatically reduces the susceptibility of the magnet to thermal degradation caused by the heat shrinking operation. This is achieved by reducing by 50% the total magnet surface area in contact with the hoop. Obviously, since more of the magnet is located deeper within the rotor, that portion of the magnet will be substantially less subject to thermal degradation and hence to demagnetization.

The halved number of magnet poles are placed on a ferromagnetic yoke in locations between an equal number of low reluctance ferromagnetic projections, with each of the permanent magnets being magnetically oriented with flux flowing in the same radial direction, i.e., either radially outward from the magnets or radially inward into the magnets. Accordingly, the ferromagnetic projections between the permanent magnet poles become ferromagnetic poles of the other polarity. For example, in a four pole machine two magnets are used, with the other two poles being induced in the ferromagnetic material between the two diametrically located permanent magnets.

Since the permanent magnet poles exhibit high reluctance and the ferromagnetic poles exhibit low reluctance, a relatively uncomplicated means of varying flux linkage between the rotor and the stator is also made possible by the present invention, which means is taught in the above-identified copending application. It should be noted that the power rating, hoop thickness, and weight of a rotor constructed according to the teachings of the present invention will be substantially identical to these characteristics as possessed by a conventional rotor.

Accordingly, it is apparent that the present invention provides a rotor exhibiting greater resistance to thermal degradation caused by heat shrinking of the retaining hoop over the rotor, as well as the minimization of undesirable axially directed parasitic fluxes resulting from poor magnetic homogeneity of high energy product permanent magnets. Additionally, the fact that a rotor constructed according to the teachings of the present invention features alternating high and low reluctance poles may facilitate variable flux linkage between the rotor and stator. The present invention therefore achieves the objects enumerated above and presents the advantages previously discussed, and does so without exhibiting any substantial disadvantage whatsoever.

DESCRIPTION OF THE DRAWINGS

These and other advantages of the present invention are best illustrated with reference to the drawings, in which:

FIG. 2 is a cross-sectional view depicting the rotor construction taught by the present invention;

FIG. 3 is a sectional view of the rotor illustrated in FIG. 2;

FIG. 4 is a cross-section of the rotor of the present invention illustrating additional features including lightening holes in the damper bars as well as conductive pole head dampers;

FIG. 5 is a cross-section of the rotor construction according to an alternate embodiment of the present invention;

DETAILED DESCRIPTION OF THE PREFERRED EMBODIMENT

Figure 1:
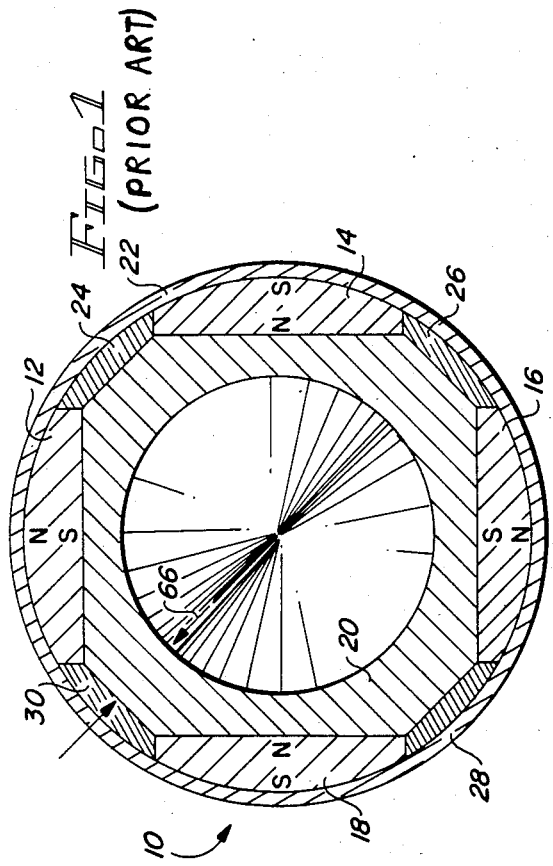
FIG. 1 a cross-sectional view of the rotor construction of a conventional permanent magnet machine.

In FIG. 1 a conventional permanent magnet rotor 10 is illustrated, with the rotor 10 having four poles generated by four permanent magnets 12, 14, 16, and 18, which are mounted around the periphery of a ferromagnetic yoke or core 20. The permanent magnets 12, 14, 16, and 18 are axially extending magnets mounted at 90° intervals around the periphery of the yoke 20. The outer surfaces of the permanent magnets 12, 14, 16, and 18 are crowned, to facilitate the installation of cylindrical retaining hoop 22 around the outer surface of the rotor 10.

It should be noted that the crowning of the permanent magnets 12, 14, 16, 18 causes self leakage, and of course that the permanent magnets 12, 14, 16, and 18 are subject to thermal degradation occurring when the retaining hoop 22 is installed by heat-shrinking.

Between the four permanent magnets 12, 14, 16, and 18 are four damper bars 24, 26, 28, and 30, which are axially extending spacers between the surfaces of the permanent magnets 12, 14, 16, and 18, which spacers provide support for retaining hoop 22, thereby preventing the hoop 22 from deforming during assembly and under high speed rotor conditions.

The damper bars 24, 26, 28, and 30 also function to minimize penetration of flux transients in the rotor 10. These flux transients are mainly harmonics which are created by switching transients in a machine stator, with the flux transients in the rotor tending to set up reaction currents which are eddy currents. If the eddy currents were induced in the ferromagnetic yoke 20, substantial losses would be incurred. However, since the damper bars 24, 26, 28, and 30 are used, which damper bars are typically made of aluminum, a much better conductor than iron, reaction currents will be set up in the aluminum. Since the aluminum is a good conductor, the losses will be substantially lower than they would otherwise be if the reaction currents were set up in the iron ferromagnetic yoke.

The damper bars 24, 26, 28, and 30 also tend to stabilize the permanent magnets 12, 14, 16, and 18 on the ferromagnentic yoke 20 during high speed rotation of the rotor 10. Since eddy current losses in the rotor 10 will be minimized by the damper bars 24, 26, 28, and 30, heat losses in the rotor 10 will be minimized. It may therefore be appreciated that there are a number of design requirements illustrated in conventional rotor 10, which design requirements must be maintained in any practical rotor design to prevent losses and to maintain stiffness and stability of the rotor.

The preferred embodiment of the present invention is illustrated in FIG. 2. A rotor 40 is illustrated which, like the conventional rotor 10 illustrated in FIG. 1, is a four pole rotor design. The rotor 40 has a ferromagnetic yoke 42, which is like the ferromagnetic yoke of a conventional rotor. The ferromagnetic yoke 42 has two permanent magnets 44 and 46 mounted thereon, with the permanent magnet 44 being mounted on the opposite side of the ferromagnetic yoke 42 from the permanent magnet 46, a displacement of 180 mechanical degrees. Like the permanent magnets of the conventional rotor 10, the permanent magnets 44, 46 of the rotor 40 are axially extending magnets having a crown surface to facilitate installation of a retaining hoop 48 around the rotor 40. Note that the permanent magnets 44, 46 are each twice the volume of each of the permanent magnets 12, 14, 16, 18 in the conventional rotor 10 (FIG. 1). Therefore, the rotor 40 of the present invention has an equivalent amount of magnetic material used in construction.

Note that the additional magnet material is disposed radially inwardly in the permanent magnets 44, 46, which means that the increment of material is not crowned but rather of rectangular shape. For instance, the additional magnetic material in the permanent magnet 44 is separated by a phantom line 49 from the material in the permanent magnet 44 corresponding to the material in the permanent magnet 12 of a conventional rotor 10 (FIG. 1).

This configuration has two benefits-first, the magnetic material is more effectively utilized because self-leakage due to crowning of the magnet is relatively less than in the case of two separate crown magnets of the same total volume (the case in the conventional rotor 10 in FIG. 1), and secondly the larger permanent magnet 44 in the rotor 40 of the present invention is less subject to demagnetization caused, for example, by heat shrinking the hoop 48 into place, than are, for example, the permanent magnets 12 and 14 of the conventional rotor 10 in FIG. 1. This is particularly true when high energy product materials such as samarium cobalt and neodymium-iron-boron are used.

Completing the construction of the rotor 40 shown in FIG. 2 are four damper bars 50, 52, 54, and 56, two of the damper bars 50, 52 being on the two sides of the permanent magnet 44, and the other two damper bars 54, 56 being on the sides of the permanent magnet 46. The damper bars 50, 52, 54, and 56 function in the same manner as the damper bars described in association with the conventional rotor 10 of FIG. 1.

It is noteworthy that the ferromagnetic, yoke 42 extends radially outward to the retaining hoop 48 on the two sides of the rotor 40 disposed by 90 mechanical degrees from the permanent magnets 44, 46 with these projections representing two consequent poles 60, 62. Consequent pole 60 is between the damper bars 50 and 56, and consequent pole 62 is between the damper bar 52 and the damper bar 54. Since the rotor 40 shown in FIG. 2 is a four pole rotor, the consequent poles 60, 62 are 180 mechanical degrees apart, and are spaced from the permanent magnet poles marked by the permanent magnets 44, 46 by 90 mechanical degrees.

It is important to note that the magnetic orientation of the permanent magnet 44 is in the same radial direction as that of the permanent magnet 46, namely that in both permanent magnets 44, 46 the north poles are facing radially outwardly and the south poles are facing radially inwardly. Therefore, it may be appreciated that the permanent magnet poles characterized by the permanent magnets 44, 46 will both be north poles in the rotor 40, while the consequent poles 60, 62 will both be south poles.

It has been determined that the rotor 40, when made with the same total amount of magnet material as the conventional rotor 10, will have approximately the same power rating, hoop thickness, and weight as the rotor 10. Although there is a weight increment due to the ferromagnetic poles 60, 62, this is offset by a weight decrement due to the smaller diameter of the yoke 42, which has the same section thickness at reference numeral 64 as in the larger diameter yoke 20 (FIG. 1) of reference numeral 66.

Therefore, while it may be appreciated that the performance, weight, and power rating of the rotor 40 of the present invention are comparable to the same features of the conventional rotor 10, the rotor 40 of the present invention possesses a number of significant advantages over the conventional rotor 10. Although the volume of magnetic material supported by the retaining hoop 48 in the rotor 40 is the same as the volume of magnetic material supported by the retaining hoop 20 and the conventional rotor 10, the total centrifugal load on the hoop 48 is less in the rotor 40 because magnets 44, 46 have a lower effective radius than do magnets 12, 14, 16, and 18 in the conventional rotor 10. This feature at least offsets the increased stress concentration in the hoop 48 due to reducing the number of magnets in the consequent pole rotor.

Additionally, the objects of the present invention are all accomplished by the rotor 40 illustrated in FIG. 2. Since a smaller percentage of the total magnet material is in contact with the retaining hoqp 48, the heat shrink installation of the retaining hoop 48 will therefore have less of a thermal degradation effect on the permanent magnets 44, 46 of the rotor 40. Since the size of the permanent magnets 44, 46 is double that of the magnets used in a conventional rotor, greater magnetic homogeneity occurs statistically in the permanent magnets 44, 46. This is particularly true when it is considered that the permanent magnets 44, 46 are preferably made of high energy product permanent magnets such as samarium-cobalt or neodymium-iron-boron. The effect of the better homogeneity of the larger bulk of magnetic material in the permanent magnets 44, 46 is to minimize to the extent possible the parasitic axial fluxes. Actually, parasitic axial fluxes are eliminated at the two consequent poles 60, 62, and this fact in conjunction with the better homgeneity of the permanent magnets 44, 46 will reduce stator losses caused by axially directed parasitic fluxes.

Additionally, it will be immediately appreciated that the magnetic poles occurring at the site of the permanent magnets 44, 46 are high reluctance poles, while the ferromagnetic poles occurring at the consequent poles sites 60, 62 are low reluctance poles since the iron from which the ferromagnetic yoke 42 is a low reluctance material, with the material permanent magnets are made from having a reluctance which is higher than electrical steel by a factor of several thousand. Because the rotor 40 has low reluctance consequent poles and high reluctance magnet poles, the rotor 40 is useful in accomplishing the task of constructing a machine having variable flux linkage between the rotor and stator, as is apparent from the above-referenced copending application, which was incorporated by reference.

The rotor 40 is illustrated in FIG. 3 to show two additional components, namely a pair of damper end rings 64, 66, which damper end rings 64, 66 help to retain the permanent magnets 44, 46 in axial position on the rotor 40 and complete the electrical paths for currents in the damper bars 50, 52, 54, 56.

Various alternate embodiments and additional features of the rotor 40 illustrated in FIGS. 2 and 3 are shown in FIGS. 4 and 5. In FIG. 4, the damper bars 50, 52, 54, and 56 have axially extending cooling and lightening holes therethrough, which holes of course have the effects of lightening the weight of the rotor 40 as well as enhancing cooling of the rotor 40. Also shown in FIG. 4 are optional conductive pole head dampers 68, which are preferably made of a good conductor such as copper or aluminum, and function to accomplish the same desireable effects as the damper bars 50, 52, 54, and 56.

A rotor 140 is illustrated in FIG. 5 which has a different configuration ferromagnetic yoke 142. In a first departure from the design illustrated in FIG. 2, a pair of permanent magnets 144, 146 are illustrated which have curved inwardly extending diameters, the curvature of the inwardly extending diameters of the magnets 144, 146 being concentric with the curvature of the outwardly extending surfaces of the magnets 144, 146. A second departure from the design illustrated in FIG. 2 is the configuration of the damper bars 150, 152, 154, 156, which configuration results in a different configuration for the two consequent poles 160, 162.

Figure 6:
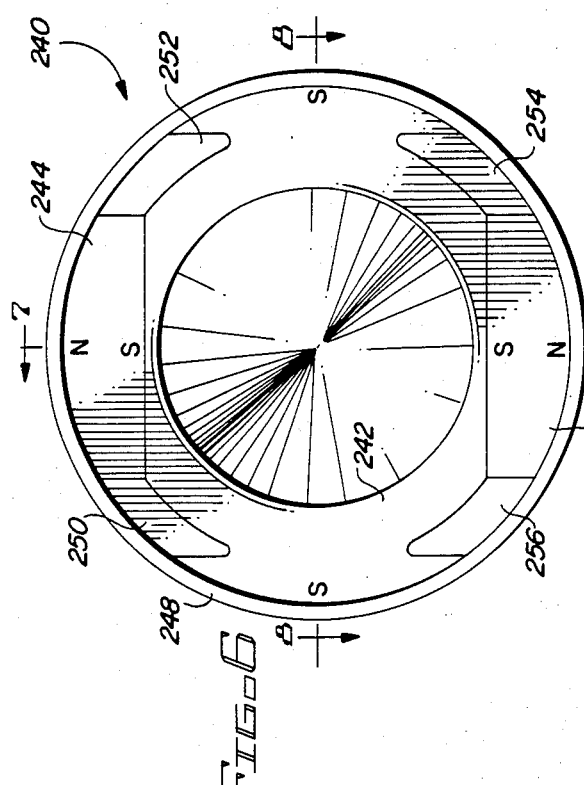
FIG. 6 is an end view of a rotor having two halves and constructed according to the teachings of the present invention, which rotor may be used advantageously in a variable flux linkage machine, and which rotor 13 is shown without the damper rings installed.
Figure 7:
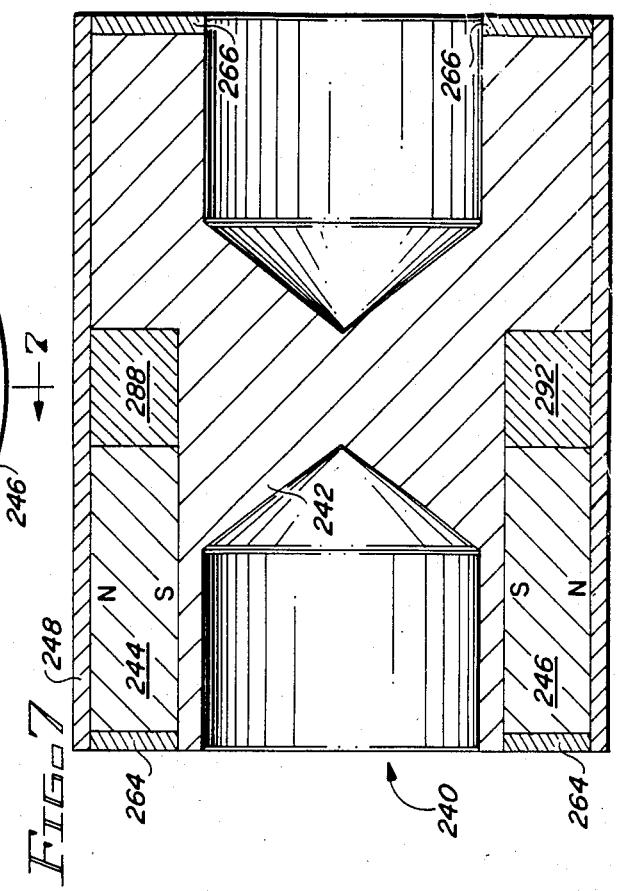
FIG. 7 is a first sectional view of the rotor in FIG. 6 with the damper rings installed.
Figure 8:
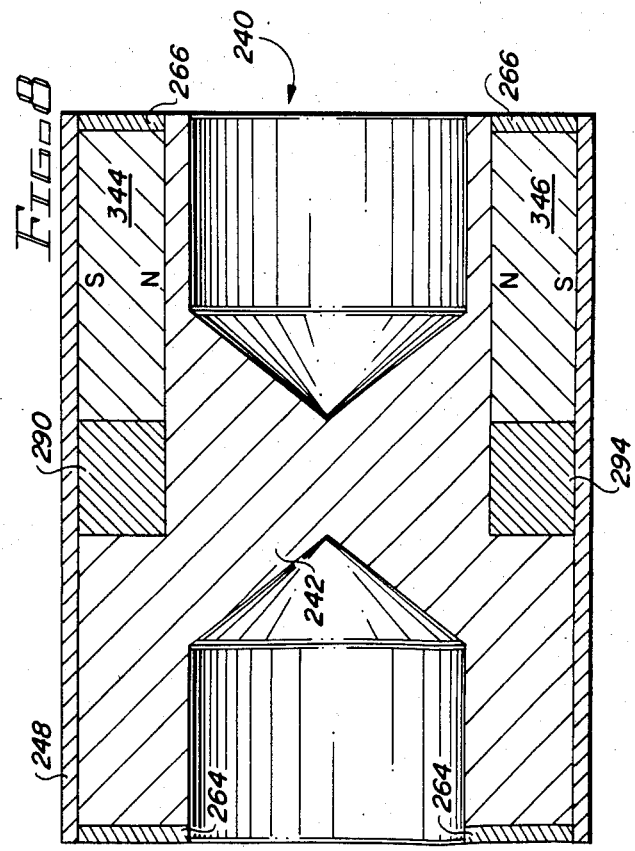
FIG. 8 is a second sectional view of the rotor shown in FIG. 6 with the damper rings installed.

Finally, FIGS. 6, 7, and 8 illustrate a double rotor 240 which actually has two separate sets of poles mounted thereon, with each set of poles comprising four poles. Double rotor 240 has both sets of poles mounted on a single ferromagnetic core 242, with a first pair of permanent magnets 244, 246 mounted at one end and a second pair of permanent magnets 344, 346 mounted at the other end. The first pair of permanent magnets 244, 246 and that end of the double rotor 240 is surrounded by one end of a retaining hoop 248, and the second pair of permanent magnets 344, 346 and that end of the double rotor 240 is surrounded by the other end of the retaining hoop 248. The first set of magnets 244, 246 are adjacent to four damper bars 250, 252, 254, and 256 and the second set of permanent magnets 344, 346 are adjacent to four damper bars (which are not shown in the figures). The rotor 240 has a first end ring 264 on the one end of the rotor 240, and a second end ring 266 on the other end of the rotor 240. Four damper spacers 288, 290, 292, and 294 are used to prevent the permanent magnets 244, 246, 344, 346 from sliding axially toward the center of the rotor 240. The damper spacers, like the damper rings and damper bars, are made of a highly conductive, non-ferromagnetic material such as aluminum.

The double rotor 240 is shown in FIGS. 6, 7, and 8 to have the two sets of permanent magnets not aligned but rather displaced by 90 mechanical degrees. It would, however, be possible to have the two sets of permanent magnets in the double rotor 240 aligned in certain applications.

The present invention therefore teaches the construction of a consequent pole rotor having the advantages discussed above, which construction affords substantially no disadvantage. It may therefore be appreciated that the rotor of the present invention represents a desirable implementation in permanent magnet machine applications.

It will be apparent to those skilled in the art that a number of changes, modifications, or alterations to the present invention as described herein may be made, none of which depart from the spirit of the present invention. All such changes, modifications, and alterations should therefore be seen as within the scope of the present invention.

What is claimed is:

1. A permanent magnet rotor for an electrical machine, comprising:
   a ferromagnetic yoke;
   a plurality of permanent magnets installed about the periphery of said ferromagnetic yoke to form permanent magnet poles, said ferromagnetic yoke having a plurality of radially outwardly extending projections disposed between said permanent magnets, said ferromagnetic projections being consequent ferromagnetic poles;
   a plurality of damper bars fitted between said permanent magnet poles and said ferromagnetic poles, said damper bars made of a non-ferromagnetic, conducting material; and
   a retaining hoop placed in interference fit fashion over said permanent magnets, said ferromagnetic projections, and said damper bars.

2. A rotor as defined in claim 1, wherein said permanent magnet poles are high reluctance poles and said ferromagnetic poles are low reluctance poles.

3. A rotor as defined in claim 1, wherein said permanent magnet poles are made of high magnetic energy product material.

4. A rotor as defined in claim 3, wherein said high energy product material, is a member of the group comprising samarium cobalt and neodymium-iron-boron.

5. A rotor as defined in claim 1, wherein said plurality of permanent magnet poles are each magnetically oriented in the same radial direction.

6. A rotor as defined in claim 1, additionally comprising:
   pole head dampers located in said ferromagnetic poles, said pole head dampers being made of conductive material.

7. A rotor as defined in claim 1, wherein said damper bars are so arranged and configured as to have a plurality of axially extending lightening holes therein.

8. A rotor as defined in claim 1, wherein said ferromagnetic frame is made of material having a low reluctance.

9. A rotor as defined in claim 1, additionally comprising:
   a pair of damper rings located at the ends of said ferromagnetic yoke, said damper rings preventing said permanent magnets from moving axially on said ferromagnetic yoke.

10. A permanent magnet rotor for an electrical machine, comprising:
    a yoke made of ferromagnetic material and essentially cylindrical in configuration, said yoke having an inner radius and an outer radius;
    a plurality of permanent magnets for installation on said yoke, said permanent magnets being crowned with a radius equal to said outer radius, portions of said ferromagnetic material being removed from said yoke to allow said plurality of permanent magnets to be received in said yoke with the crown of said permanent magnets coincidental with said outer radius of said yoke, said permanent magnets each being magnetically oriented in the same radial direction, said permanent magnets being equally spaced apart around the outer periphery of said yoke, with the ferromagnetic material remaining between said permanent magnets forming consequent ferromagnetic poles;

a plurality of axially extending damper bars made of an electrically conductive, non-ferromagnetic material, said damper bars being located in said yoke between said permanent magnets and said ferromagnetic poles with portions of said ferromagnetic material removed to allow said damper bars to be received in said yoke, said damper bars being so arranged and configured as to be coincidental with said outer radius of said yoke; and a cylindrical retaining hoop made of non-magnetizable material and located in interference fit fashion over said outer radius of said yoke, retaining said permanent magnets and said damper bars in said yoke.

11. A permanent magnet rotor for an electrical machine, comprising:

a ferromagnetic yoke;

a first plurality of poles located at one end of said ferromagnetic yoke, said first plurality of poles being alternating high reluctance permanent magnet poles mounted on said ferromagnetic yoke and low reluctance poles formed by projections from said ferromagnetic yoke;

a second plurality of poles located at the other end of said ferromagnetic yoke, said second plurality of poles being alternating high reluctance permanent magnet poles mounted on said ferromagnetic yoke and low reluctance poles formed by projections from said ferromagnetic yoke;

a first plurality of axially extending damper bars between adjacent ones of said first plurality of poles;

a second plurality of axially extending damper bars between adjacent ones of said second plurality of poles;

means for preventing said permanent magnets from moving axially on said ferromagnetic yoke; and a retaining hoop mounted around said ferromagnetic yoke, said permanent magnet poles, said ferromagnetic poles, said damper bars, and said preventing means.

12. A rotor as defined in claim 11, wherein said first plurality of poles and said second plurality of poles are so arranged and configured as to have permanent magnet poles in said first plurality of poles aligned with ferromagnetic poles in said second plurality of poles, and vice-versa.

13. A rotor as defined in claim 11, wherein said first plurality of poles and said second plurality of poles are so arranged and configured as to have permanent magnet poles in said first plurality of poles aligned with permanent magnet poles in said second plurality of poles, and ferromagnetic poles in said first plurality of poles aligned with ferromagnetic poles in said second plurality of poles.

14. A rotor as defined in claim 13, wherein each ferromagnetic pole in said first plurality of poles aligned with a ferromagnetic pole from said second set of poles is formed of a unitary segment of ferromagnetic material.

15. A rotor as defined in claim 11, wherein said preventing means comprises:

a plurality of damper spacers made of conductive, non-ferromagnetic material preventing said permanent magnets from moving axially inwardly with respect to said ferromagnetic yoke; and a pair of damper rings located at the ends of said ferromagnetic yoke, said damper rings preventing said permanent magnets from moving axially outwardly with respect to said ferromagnetic yoke.

16. A permanent magnet rotor for an electrical machine, comprising:

a ferromagnetic yoke having a pair of oppositely disposed radially outwardly extending projections being consequent ferromagnetic poles;

a pair of permanent magnets oppositely disposed about the periphery of said ferromagnetic yoke generally between the consequent ferromagnetic poles thereof;

four non-ferromagnetic conducting material damper bars with an individual damper bar generally disposed between adjacent permanent magnets and ferromagnetic projections; and a retaining hoop disposed around said permanent magnets, said ferromagnetic projections, and said damper bars.

17. A rotor as defined in claim 16, wherein said permanent magnets have poles of high reluctance and said ferromagnetic poles are low reluctance poles.

* * * * *